United States Patent Office 3,440,732
Patented Apr. 29, 1969

3,440,732
RECOVERY OF COMPLEX TUNGSTEN AND MOLYBDENUM COMPOUNDS FROM SOLUTIONS
Vincent Chiola, Robert E. Dodds, and Clarence D. Vanderpool, Towanda, Pa., assignors to Sylvania Electric Products Inc., a corporation of Delaware
No Drawing. Filed Sept. 19, 1967, Ser. No. 668,950
Int. Cl. F26b 7/00, 5/06; C01g 57/00
U.S. Cl. 34—5
18 Claims

ABSTRACT OF THE DISCLOSURE

Complex inorganic compounds that are normally unstable during isolation from solutions (specifically aqueous solutions) thereof, because of their complex, heat-sensitive molecular structure when the solvent is evaporated from the solution by directly applied heat alone, are isolated in an improved purity and higher yield, together with other advantages, by a combination of (1) preconcentration of the solution with indirect heat and while sparging it with a nonoxidizing gas, e.g., nitrogen, argon or helium, followed by (2) final concentration and removal of solvent by sublimation or lyophilization, i.e., freeze-drying.

---

The technique of the invention is especially applicable to the isolation of heteropoly acids of tungsten and of molybdenum, and metatungstate salts from aqueous solutions thereof. Examples of heat-sensitive and difficult-to-crystallize complex materials of this kind are tungstoboric, tungstogermanic, molybdogermanic, tungstochromic, tungstovanadic and molybdotungstophosphoric acids; and the metatungstate salts of such metals as aluminum, barium, cadmium, calcium, cesium, chromium, cobalt, silver, lead, lithium, magnesium, nickel, silver, strontium, and the rare-earth metals of the lanthanide series.

This invention relates broadly to a method of preparing (including isolation of) complex tungsten and molybdenum compounds. More particularly it is concerned with an improvement in a method of recovering such compounds, e.g., heteropoly compounds (specifically heteropoly acids) of tungsten and molybdenum, and metatungstates, from solutions (especially aqueous solutions) thereof. Still more particularly the invention relates to the recovery of such compounds as stable, water-soluble materials while avoiding or minimizing decomposition during removal of the solvent.

It is known that certain complex compounds of tungsten and molybdenum are isolatable, e.g., by crystallization, from aqueous solutions. Such compounds include tungstophosphoric acid, tungstosilicic acid, molybdosilicic acid and ammonium metatungstate, all of which are relatively easy to isolate, as by crystallization, in stable form from aqueous solution by conventional evaporative methods.

Theoretically many elements other than phosphorus and silicon are capable of acting as the central atom or heteroatom (i.e., foreign atom or anion) in complex polytungsten or polymolybdenum compounds (e.g., acids). [Reference: Emeleus and Anderson, Modern Aspects of Inorganic Chemistry, chapter IX, Van Nostrand & Company (1960).] Theoretically, too, metatungstates may be readily synthesized and isolated in crystalline form. In practice, however, crystalline poly acids containing heteroatoms other than phosphorus and silicon are difficult to isolate and the yield is low. Metatungstates, other than the ammonium salt, likewise have not been readily available, because they are difficult to isolate as stable, solid or crystalline products from aqueous solutions thereof.

Although techniques are known for preparing solutions of isopoly acids or of metatungstates, efforts to produce useful commercial products have been stymied prior to the present invention. By this it is meant that conventional, evaporative crystallization methods are unsatisfactory for isolating stable, crystalline or amorphous solid materials of the aforementioned kind from solution. Usually, by the prior methods, one or more of the following occur:

(1) Complete or excessive decomposition.
(2) Inefficient recovery of products.
(3) Products of poor stability.
(4) Products having low solubility in water.

Such methods as batch evaporation, spray-drying and thin-film evaporation fall within the scope of the abovementioned conventional evaporative methods. These methods are unsatisfactory for solving the above-described isolation and recovery problems because they all have in common the requirement for heat input as the sole means for the removal of solvent.

To emphasize and amplify the foregoing brief statement of the applicants' problem, it may be further stated that the crystallization of stable, isopoly compounds such as tungstophosphoric acid, tungstosilicic acid and the stable ammonium metatungstate is conventionally accomplished by the evaporation of solvent, usually water. Other heteropolytungstates, heteropolymolybdates, and metatungstates are, in general, heat-sensitive materials which are therefore difficult to crystallize by the application of heat to evaporate the solvent. In some cases, even a mild evaporative method such as passing air over a tray-like container at ambient temperature (about 25° C.) is unsuccessful in isolating the desired product.

Examples of heat-sensitive and difficult-to-crystallize complex materials of the kind described above and with the isolation of which this invention is concerned are tungstoboric, tungstogermanic, tungstochromic, tungstovanadic, molybdotungstophosphoric, and molybdogermanic acids; also, the metatungstate salts of such metals as, for instance, aluminum, barium, cadmium, calcium, cesium, chromium, cobalt, copper, lead, lithium, magnesium, nickel, silver, strontium, rare-earth metals of the lanthanide series (e.g., dysprosium, cerium, europium, gadolininum, holmium, lanthanum, neodymium, samarium and terbium) and yttrium which is now commonly considered to be a member of the family of rare-earth metals of the lanthanide series. Many of these metatungstate salts of the rare-earth metals (including yttrium) are believed to be new compounds per se.

The increasing interest in the investigation of tungsten and molybdenum compounds, especially those of a complex structure such as the heteropolytungsten and -molybdenum compounds, as catalysts or as auxiliary catalytic aids, in the chemical, petroleum refining, polymerization and related arts makes a practical and economic solution to the foregoing problem of extreme importance both to the manufacturers and to the users or potential users of such compounds. For the former it increases the field of utility of his basic and specialty products; for the latter it means either lower manufacturing costs due to the use of improved catalysts and/or the production of materials, e.g., polymeric materials, having improved properties.

A primary object of the present invention is to provide a method for recovering complex, water-soluble compounds of tungsten and of molybdenum from aqueous solutions thereof.

Another object of the invention is the obtainment of heteropoly acids of tungsten and of molybdenum as stable, crystalline or amorphous solid, water-soluble compounds.

Still another object of the invention is the obtainment of metatungstate and similar complex salts as stable, crystalline or amorphous solid, water-soluble compounds.

Another object of the invention is the obtainment of crystalline or amorphous solid, complex tungsten or molybdenum compounds that are stable after isolation, can be stored under ambient conditions of temperature and pressure, and can be redissolved in aqueous solutions without decomposition of formation of insoluble matter.

A further object of the invention is to provide a method of isolating stable, crystalline or amorphous solid, heteropoly compounds and metatungstate compounds without incurring decomposition during crystallization or solidification.

Other objects of the invention will be apparent to those skilled in the art from the following more detailed description and from the appended claims.

The objects of the invention are attained as a result of our discovery that normally unstable, inorganic, complex, isopoly or heteropoly compounds can be isolated and recovered from solution by a process involving preconcentration by (1) heating, preferably with indirect heat, in intimate contact with (as by sparging) and under gaseous nitrogen and/or or other non-oxidizing (anerobic) gas or gases and (2) crystallization or low-temperature drying at reduced pressure (i.e., under vacuum) until a solid product, which is incompletely dehydrated, has been recovered. Thus, by practicing the instant invention, many heteropolytungstates, heteropolymolybdates and metatungstates that normally have not been insoluatable in crystalline, water-soluble form can now be recovered as crystalline, water-soluble solids. Additionally it has been found that materials of the kind herein involved, and which prior to our invention were not isolatable from an aqueous solution, can now be isolated by carrying our invention into effect.

A combination of evaporation under nitrogen (or other non-oxidizing atmosphere, e.g., argon, helium or other inert gas) followed by freeze-drying, or the aforesaid combination wherein freeze-drying is accompanied (in whole or in part) or followed by vacuum evaporation, results in efficient recovery of stable products; eliminates decomposition during removal of solvent; allows control of moisture in or water content of the final product; and permits recovery of a crystalline or amorphous product that does not deteriorate or lose its water-solubility during storage. Recovery of heteropoly or isopoly compounds by this method is not affected by the presence of mineral acids in solution nor is special handling during manufacture necessary in order to prevent decomposition.

Drying by sublimation of solvent or lyophilization, commonly referred to as "freeze-drying," is now fairly widely employed as means for preserving biological materials and microörganisms, food products, drugs, and other natural and/or synthetic organic substances. This drying method is used because such materials are inherently prone to be heat-sensitive and are labile in ordinary environments such as air, oxygen, bacteria, etc. On the other hand, inorganic chemicals are normally much more stable to environment and heat, and lyophilization has not been considered a useful, economical method of processing such materials or in isolation thereof from solutions.

The compounds involved in the problem with which the present applicants were confronted, namely, the isolation or recovery of heteropolytungsten and heteropolymolybdenum compounds, and metatungstates, are characterized, in general, by having coordinated structures of tungsten or molybdenum oxide octahedra that have a central tetrahedral ion in heteropoly compounds. Metatungstates are similarly characterized by having octahedral groups arranged about a hole (i.e., a space unoccupied by a heteroatom) or an oxygenated water molecule, i.e., $H_2O_4$. The arrangement suggests a large cage-like structure having the capability of absorbing or desorbing water molecules in the characteristic manner of a zeolite. Thus, water molecules are believed to constitute an important role in the stabilization of such molecular structures.

Isopoly acids form in a similar manner by condensation or aggregation of tungsten or molybdenum oxide groups into coordinated structures of oxide octahedra.

The formation of heteropoly acids or their salts by crystallization from solution requires the condensation or aggregation of tungsten oxide groups about the central ion. Such materials usually contain water of composition as well as water of hydration.

From the foregoing description of the characteristics of the compounds involved in practicing this invention, it will be readily appreciated by those skilled in the art that the removal of water, if not very carefully done, can lead to collapse of the complex structure. It will also readily be appreciated that stability of the structure is affected by space requirements to accommodate the central ion. When phosphorus or silicon oxides constitute the basis of the central tetrahedral ion, very little or no distortion of the structure occurs. There is present a high degree of stability because the space available for the central ion is compatible with the size of the phosphorus and silicon tetrahedral. Other potential heteropoly ions, e.g., boron and germanium, differ sufficiently in ionic size to create a distorted and potentially more unstable structure on crystallization.

Similarly, the stability of the isomorphic metatungstates, based on retaining the cage-like complex structure on crystallization, depends on water of constitution, as well as upon the type and size of the cationic portion of the molecule.

In addition to the foregoing considerations that apply primarily to the stability during the final steps in the process of isolation of condensed polytungstates or polymolybdates and particularly to controlled dehydration, we have surprisingly and unobviously found that removal of gross amounts of water is an equally critical step in isolating the desired compound. The present invention provides means whereby a heat-evaporative technique can be employed to remove large quantities of water from heteropolytungsten and heteropolymolybdenum solutions, as well as from isopoly salt solutions, without appreciable decomposition or degradation, if any, of the compound to be isolated.

As has been indicated hereinbefore, the problem was solved by evaporation of a solution containing the desired compound in and under (as by sparging, for example) an atmosphere of nitrogen and/or other non-oxidizing gas. Heat can be applied while sparging nitrogen, for instance, through the solution to eliminate oxygen in the solution and in the atmosphere of the vessel above the solution.

It is postulated that the presence of oxygen during removal of water, as in a preconcentration stage of the kind herein involved, contributes to oxidation and breakdown of the aforementioned complex structure of the compounds with the isolation of which this invention is concerned. Degradation of the normal octahedral structure results in reversion to the most stable oxide form having the lowest energy potential, e.g., tungsten trioxide in the case of the complex tungsten compounds.

That heteropoly compounds of tungsten and of molybdenum are highly susceptible or sensitive to factors that affect stability or resistance to degradation is apparent from a consideration of their unusual oxidation-reduction properties. Numerous authorities have shown that heteropolytungstates and -molybdates are strong oxidizing agents, being comparable to chromic acid in oxidation potential. They are readily reduced even by mild oxidizing agents, e.g., bromine water and hydrogen peroxide. Strong reduction of these complexes tends to disintegrate the compounds completely and results in products having lower molecular weights.

More significant, from the standpoint of the problem solved by the present invention, is the fact that reoxidation of lower-molecular-weight products results in simple tungstate or molybdate compounds. We have repeatedly noticed that, in processing solutions of tungsten and molybdenum compounds to remove solvent by evaporative methods, there occurs discoloration to bluish, greenish or bluish-green solutions indicative of reduction. It is postulated that reduction products of lower molecular weight are first formed, and that these are reoxidized during removal of solvent by evaporation in the presence of oxygen to form stable oxides. The recognized strong oxidative properties and lability of the aforementioned complex tungstates and molybdates in oxidation-reduction reactions are an important factor in this reaction. Concentration of a strong oxidant, such as occurs during preconcentration, is believed to contribute to degradation via breakdown of the complex octahedral structure and reversion to the more stable metal trioxide form. In marked contrast, the presence of a non-oxidizing gas, specifically $N_2$, was surprisingly found to modify and/or eliminate the oxidation-reduction characteristics of polytungstates and polymolybdates. Formation of reduced compounds is almost completely (or entirely) eliminated, and reoxidation of such reduced compounds that may be present is prevented.

The improvement of the present invention is applicable to the recovery of complex tungsten and molybdenum compounds from solutions, especially aqueous solutions, thereof that have been prepared by conventional methods already known in the art or by methods such as are disclosed and claimed in various copending applications, namely, the copending applications of Vincent Chiola and Clarence D. Vanderpool, Serial No. 435,070, filed Feb. 24, 1965, Serial Nos. 603,792 and 603,793, each filed Dec. 22, 1966, and Serial No. 629,889, filed Apr. 11, 1967; and the copending application of Vincent Chiola and Jerome G. Lawrence, Serial No. 605,177, filed Dec. 28, 1966. All of these copending applications are assigned to the same assignee as is the present invention and by this cross-reference are made apart of the disclosure of the instant application.

The classical method of making heteropolytungstic or heteropolymolybdic acids is to acidify a solution containing sodium tungstate or sodium molybdate and a sodium salt that contains the heteroatom. The heteropoly acid is separated from the salt solution by ether extraction. It is recovered either as an etherate by evaporation of the ether or in pure form by breaking down the ether-heteropoly acid complex by heating with water or a dilute mineral acid, usually hyrochloric acid. Solutions of, for example, 12-tungstophosphoric, 12-tungstosilicic, 12-tungstoboric and 12-tungstogermanic acids can be prepared in this manner by starting with (a) sodium tungstate and (b) sodium phosphate, sodium silicate, sodium borate or sodium germanate, respectively. Heteropolymolybdic acids can be similarly prepared by starting with sodium molybdate and the appropriate salt of the heteroatom. Ether extraction my be eliminated by contacting an aqueous solution of sodium heteropolytungstate or sodium heteropolymolybdate solution with a cation-exchange material, such as a cation-exchange resin, on the hydrogen cycle as is described in, for example, U.S. Patents 2,503,991—Bechtold and 3,288,562—Laferty.

Solutions of the more commonly available heteropoly acids such as tungstophosphoric, tungstosilicic, molybdophosphoric and molybdosilicic acids can be evaporated by conventional means using heat to crystallize the stable compounds from aqueous solutions thereof in yields that are commercially acceptable. In the case of other less stable heteropoly acids, e.g., tungstogermanic, tungstoboric and other heteropoly acids mentioned hereafter and in the aforementioned copending applications, the yields are usually unsatisfactory when conventional evaporative methods are employed due to decomposition of the heteropoly compound and the formation of insoluble products.

It is known to prepare various water-soluble salts of metatungstic acid. Metatungstic acid is first prepared by, for example, acidifying an aqueous solution of sodium or ammonium metatungstate, followed by ether extraction and hydrolysis (as previously has been described with reference to the preparation of a heteropolytungstic or -molybdic acid) to yield an aqueous solution of metatungstic acid. Alternatively, the sodium or ammonium ion can be removed by contacting the corresponding metatungstate solution with a cation-exchange resin or other such ion-exchange material on the hydrogen cycle thereby to obtain an aqueous solution of metatungstic acid. Reaction of this metatungstic acid solution with an appropriate salt (including hydroxide) solution, e.g., lithium hydroxide, cesium chloride, calcium hydroxide and other salts of cations the metatungstate of which is desired, yields a solution of the corresponding metatungstate salt. Examples of such other cations (in addition to the aforementioned lithium, cesium and calcium) of which the metatungstates can be formed, as just described, are: aluminum, barium, cadmium, chromium, cobalt, copper, lead, magnesium, nickel, silver, strontium, rare-earth metals of the lanthanide series (e.g., dysprosium, cerium, europium, gadolinium, holmium, lanthanum, neodymium, samarium and terbium), and yttrium. Isolation of the stable metatungstate salt without excessive decomposition and in satisfactory yield has been a serious problem prior to the instant invention because conventional evaporation methods resulted in decomposition and thereby materially lowered the yield. The present invention obviates this difficulty.

As indicated hereinbefore, the solutions of the heteropolytungsten acids, of the heteropolymolybdenum acids and of the metatungstate salts are prepared by conventional methods and/or by other known procedures described briefly above and in the aforementioned copending applications.

The preconcentration step

In practicing this invention the removal of the solvent and the concentration of the solution containing the desired compound are accomplished by sparging nitrogen and/or other non-oxidizing gas through a heated, agitated solution (e.g., an aqueous solution) of the aforementioned acid of tungsten and/or molybdenum, or metatungstate salt. A sufficient volume of gas is sparged through the solution to insure complete purging of air and/or other oxygen-containing gas from the solution and to insure a non-oxidizing gaseous atmosphere in the vessel above the liquid surface of the solution. Mainly for reasons of economy and convenience, the preferred solvent is water; but other solvents of an organic or inorganic nature may be used in lieu of all or part of the water in the solution to be concentrated.

Satisfactory purging and evaporation of the solvent are accomplished at a temperature within the range of from about 65° C. to about 85° C., e.g., 70°–80° C. (when water is the solvent) with minimum risk of localized heating and decomposition. Other temperatures ranging, for example, from ambient temperature to 100° C. and higher may be used depending, for instance, upon the particular solvent employed and the sensitivity of the particular compound to be isolated.

Indirect heating of the solution, as by the use of a covered vessel provided with agitating means and a jacket to which steam or other hot fluid is fed, is preferred over direct-heating means such as gas-firing, immersion heating, and the like. Sufficient agitation, more particularly mechanical agitation, is provided to prevent localized overheating and possible localized points of decomposition.

Typically, a 30-fold reduction in the volume of the solution is effected before proceeding to the next processing step directed to isolation of a solid, specifically crystallized product. However, in ion-exchange preparative methods for making the less stable heteropolytungsten, heteropolymolybdenum and metatungstate compounds it is often necessary and preferable to employ more dilute solutions and in such cases it may be necessary to effect greater volume reductions, e.g., 100-fold. Volume reductions ranging from about 97% to about 10%, usually from about 95% to about 50% of the original volume generally are required, depending upon the volume of solution to be handled. A limiting and critical factor is the practicability of handling the concentrate as determined by its viscosity, the solubility of the product, and the crystallization of the product in the concentrated solution.

Either batch or continuous feed methods of charging the sparging vessel cvan be employed. Continuous-feed technique has been found to be particularly appropriate when large volumes of solution are being handled, and it is desired to limit the size of the vessel in which the solution is to be concentrated.

The freeze-drying step

Crystallization or low-temperature drying at reduced pressure (i.e., under vacuum) is accomplished by the use of standard or conventional laboratory or commercial freeze-drying equipment. In this step final concentration and removal of solvent are effected by sublimation or lyophilization.

In a typical freeze-drying crystallization step in the method of this invention, a concentrated solution of heteropoly acid or metatungstate salt, as obtained from the above-described preconcentration step, is loaded into trays to a preferred liquid level, e.g., about 0.5 inch. The solution is pre-frozen in any suitable manner, e.g., by placing the trays on DRY-ICE, or in a freezer, or by chilling with liquid nitrogen, after which the trays containing the prefrozen solution are loaded onto a pre-chilled shelf into a commercial freeze-dryer such as a Stokes Model 12P unit. It is preferred to have the concentrate pre-frozen in order to minimize processing time and the cost of freeze-drying. Relatively shallow loading of the trays is preferred for the same reason.

Lyophilic-vacuum crystallization proceeds for a period of about 15 hours. The freeze-drying cycle may vary, for instance, from 3 to about 24 hours or more depending upon the quantity of solvent to be sublimed. In laboratory freeze-drying tests, where a 30-fold reduction in volume had been effected in the preconcentration step using a nitrogen sparge, a freeze-drying time cycle of as short as 3 hours sufficed to provide a stable, crystalline product.

The temperature of the material being freeze-dried is preferably maintained at below −50° C. for approximately the entire time cycle. In some cases it may be advantageous to allow the temperature to increase slowly during the cycle in order to accelerate the sublimation of the water. Shelf heating may be effectively employed for heating. Temperatures ranging from below −50° C. to about 25° C. (i.e., at or about ambient temperature) may be used in the freeze-drying cycle.

The applied vacuum initially is as low as is possible, but generally is of the order of 50 torr (i.e., 50 mm. Hg) when using commercial equipment. Reduced pressures down to 1–3 torr (obtainable with laboratory freeze-drying units) or up to 100 torr provided by commercial freeze-dryers can be employed.

The rate of water sublimation is a function of equipment size, and typically may be at the rate of from ½ pound to 5 pounds or more per hour. The rate of water removal is not critical.

A critical factor in the freeze-drying step is the necessity to effect controlled dehydration of the product. For reasons mentioned hereinbefore, it is essential to the stability of the complex compounds with which this invention is concerned that some water molecules, in the form of water of constitution and water of hydration, be retained by the compound. Types of products heretofore processed and obtained by freeze-drying techniques (i.e., other than heteropoly acids and metatungstate salts) are generally completely dehydrated. With such materials it is usually desired to obtain products that can be readily reconstituted with water, or possess certain physical properties, or are preserved for a long period of time in a completely dehydrated state.

Complete dehydration of the compounds herein involved is undesirable. Thus, 12-tungstogermanic acid as isolated by the process of this invention (see Example V) was found to contain 9 molecules of water of hydration and 2 molecules of water of constitution:

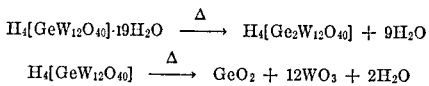

$$H_4[GeW_{12}O_{40}] \xrightarrow{\Delta} GeO_2 + 12WO_3 + 2H_2O$$

Illustrative examples of heteropolytungstic and heteropolymolybdic acids that can be isolated from aqueous solutions in accordance with the improvement of this invention are, in addition to those previously mentioned, heteropolytungstic and heteropolymolybdic acids wherein the heteroatom is at least one of the following: aluminum, antimony, arsenic, cerium, cobalt, nickel, niobium, tin and titanium. Numerous examples of metatungstate salts that can be prepared and satisfactorily isolated by practicing the present invention have been given hereinbefore.

In order that those skilled in the art may better understand how this invention can be carried into effect, the following examples are given by way of illustration and not by way of limitation. All parts and percentages are by weight unless otherwise stated.

Example 1.—Preparation and isolation of tungstovanadic acid

Twenty-seven and one-tenth (27.1) grams of $V_2O_5$ was dissolved in 100 ml. of 50% HF to form a clear, brown solution.

The vanadium fluoride solution was added to a solution of 396 g. of sodium tungstate ($Na_2WO_4 \cdot 2H_2O$) in 3000 ml. of deionized water. The pH of the solution was 5.4 at 70° C. The solution was agitated while heating to 90°–95° C. for approximately 30 minutes during which period concentrated HCl was added to reduce the pH to 0.6–0.7. The solution was reddish orange in color.

The reddish orange solution was extracted with ether using a 1:1 volume ratio of ether to aqueous solution. Approximately 50 g. of the resulting ether complex was mixed with 250 ml. of water, after which the solution was warmed to remove the ether.

The aqueous solution of tungstovanadic acid was placed in a jacketed glass reaction kettle provided with a stirrer, and nitrogen gas was bubbled through the solution while stirring (agitating) and heating it by circulation of steam through the jacket of the kettle. (The volume of nitrogen used for sparging in this example and other examples that follow was sufficient to purge air from the solution and from the atmosphere above the liquid level in the kettle, and sufficient to maintain such non-oxidizing conditions throughout the evaporation period.) The solution was evaporated from a volume of 3000 ml. of approximately 100 ml. Only slight decomposition occured along the sides of the vessel.

The resulting clear, brown, preconcentrated solution was transferred to a laboratory rotary freeze-dryer where it was subjected to lyophilic-vacuum evaporation to produce a brownish yellow powder. Freezing was effected by lowering the pressure in the system to 1–3 torr. Sublimation of the solvent occurred upon maintaining vacuum conditions until complete break-up of the crystalline product took place.

The thusly isolated tungstovanadic acid was completely soluble in deionized water at room temperature, and the solution was strongly acidic (pH of less than 1). X-ray diffraction examination showed the typical cubic lattice characteristic of heteropolytungstic acids.

Example 2.—Preparation and isolation of molybdogermanic acid

Pure-grade molybdenum trioxide (1728.0 g.) was slurried in 100 ml. of water containing 108.55 g. of $GeO_2$ of 97.3% assay. The slurry was heated at 90° C. for 30 minutes, whereupon it became strongly acidic and was converted into a thick gel. To thin this gel, 1200 ml. of water and 200 g. of sodium hydroxide pellets were admixed therewith. The solid material in the slurry dissolved completely to give a dark-green solution.

This dark-green solution was passed through a cation-exchange resin on the hydrogen cycle. This resin was a sulfonated copolymer of styrene and divinylbenzene (cross-linking component) wherein the latter constitutes from about 6 to about 10 mole percent, and specifically about 8 mole percent, of the copolymer. It has a void volume of from 30 to 50%, specifically about 40%. It is a commercially available product (Illco 211 of Illinois Water Treatment Company, Rockford, Ill.). Passage of the aforementioned solution through this resin on the $H^+$ cycle removed sodium and gave an aqueous solution of a free-acid product, viz, molybdogermanic acid.

In the conventional manner a portion of the solution was evaporated on the steam bath at 80° C., and a yellow crystalline material was recovered. However, on dissolution in water a highly turbid solution was obtained indicating incomplete solubility of the isolated product in the water and that degradation of the molybdogermanic acid had occurred during crystallization.

In accordance with the procedure of the instant invention 1000 ml. of the aqueous solution of the free-acid product was preconcentrated while sparging with nitrogen and then was freeze-dried. This was done by placing the solution in a jacketed glass kettle of the kind described in Example 1, and the solution was evaporated to a volume of 130 ml. under indirect steam heat while stirring and sparging with nitrogen gas as described in the preceding example.

The preconcentrated solution was transferred to a laboratory rotary freeze-dryer wherein it was completely dried by lyophilic-vacuum evaporation in approximately 10 hours at 1–3 torr.

The product, molybdogermanic acid, was a yellow crystalline powder that was completely soluble in water (indicative of no degradation) to yield an aqueous solution having a pH of less than 1. X-ray diffraction examination showed the typical body-centered cubic structure associated with heteropoly compounds.

Example 3.—Preparation and isolation of molybdotungstophosphoric acid $H_7[P(Mo_2O_7)_5(W_2O_7)] \cdot xH_2O$ Molybdotungstophosphoric acid is a heteropoly compound, more particularly a heteropoly acid, that also falls within the classification of either a heteropolytungsten compound or a heteropolymolybdenum compound, and is so considered herein.

Seven hundred and twenty (720) grams of molybdenum trioxide, 330 grams of sodium tungstate, $Na_2WO_4 \cdot 2H_2O$, and 34 ml. of phosphoric acid (85% $H_3PO_4$) were slurried in 3000 ml. of deionized water. This mixture was heated to 90°–100° C. with agitation for 2 hours. Then, in order to insure complete oxide dissolution and to eliminate the remaining turbidity, 10 g. of NaOH pellets was added.

The resulting clear, green aqueous solution was passed through a cation-exchange resin (Illco 211) on the hydrogen cycle as described in Example 2 in order to remove the sodium and to generate a deep green effluent which was an aqueous solution of a free-acid product, viz, molybdotungstophosphoric acid.

The volume of the above-described aqueous solution of the free-acid product was reduced in a steam-jacketed vessel accompanied by nitrogen sparging and heating of the solution, as described in Examples 1 and 2, in order to eliminate air from the solution and to insure non-oxidizing conditions during the evaporation period. Sparging and heating were continued for about 10 hours, yielding a heavy green liquid having slight turbidity. The turbidity was eliminated by filtration through a paper filter-pad.

The filtrate, a clear dark green solution, was transferred to a laboratory rotary freeze-dryer. Crystallization was effected by freezing the solution in liquid nitrogen and vacuum evaporation, i.e., sublimation of aqueous solvent under reduced pressure while maintaining the contents of the vessel in a frozen condition at −10° C.

The resulting solid product, molybdotungstophosphoric acid, was completely soluble in water to give a strongly acidic solution (pH of less than 1). X-ray diffraction examination showed the typical heteropoly-type, body-centered cubic structure isomorphous with phosphotungstic acid.

Example 4.—Preparation and isolation of chromium metatungstate

Fifteen hundred (1500) grams of ammonium metatungstate was dissolved in 2000 ml. of deionized water. This solution was then passed through a cation-exchange resin (Illco 211) on the hydrogen cycle to convert the ammonium metatungstate to the free-acid form. The metatungstic acid solution was converted into barium metatungstate by neutralization with barium carbonate to a pH of 4.0.

A hot solution of the barium metatungstate was passed through a cation-exchange resin (Illco 211) which had previously been placed on a $Cr^{+3}$ cycle to effect an exchange of barium ions for chromium ions.

Five hundred (500) ml. of the deep blue effluent, which was an aqueous solution of chromium metatungstate was placed in a jacketed vessel of the kind described in the preceding examples. The solution was evaporated while sparging with $N_2$ and indirectly heating with steam for about 3 hours. The preconcentrated solution showed no appreciable formation of solids or visual evidence of degradation.

After filtration for purpose of improved clarity, about 50 ml. of the clear, blue-green solution was transferred to a laboratory rotary-type dryer. The vessel containing the aforesaid solution was immersed in liquid nitrogen to freeze the solution. Freeze-drying, i.e., vacuum evaporation of the solvent by sublimation, was effected at 1–3 torr to give a green, glassy, solid product, viz, chromium metatungstate.

The product was soluble in water as a concentrate, yielding a strongly acidic solution. Chemical analysis of the solid product showed the following: 71.2% W; 3.4% Cr; and ratio of W to Cr=6:1. This conforms to an empirical formula $Cr_2[H_2W_{12}O_{40}] \cdot 3H_2O$.

Example 5.—Preparation and isolation of tungstogermanic acid (A) Preparation of solution.—Sodium tungstate crystals, $Na_2WO_4 \cdot 2H_2O$ (3.32 lbs.), were added to 1.5 liters of deionized water. Complete dissolution took place upon heating the slurry to 85° C. To this solution was then added 0.09 lb. of germanium dioxide, $GeO_2$. The pH of the resulting solution was then reduced to 2.4 by the dropwise addition of 12.4 molar hydrochloric acid. After 2 hours' digestion at 85° C., the solution was clarified by filtration and passed through a bed of cation-exchange resin (Illco 211) that had been previously placed on the hydrogen cycle. The effluent, a dilute aqueous solution of tungstogermanic acid, was practically free of sodium (i.e., less than 0.05%).

(B) One and one-half liters (1.5 l.) of tungstogermanic acid, prepared as described under A) was placed in a two-liter, glass-jacketed, glass kettle equipped with a cover, gas-sparging equipment and a mechanical agitator. The solution and kettle were first purged with nitrogen gas for 30 minutes at a rate sufficient to cause mild agitation of the solution. While continuing to sparge with nitrogen gas, the agitator was turned on and the solution was heated to 75°–80° C. by passing steam into the jacket of the kettle. Heating, mechanical agitation and sparging with nitrogen gas were continued for three hours at 75°–80° C. until the volume of liquid in the kettle was reduced to one-tenth the original volume, i.e., 150 ml. The solution was cooled to approximately room (ambient) temperature by passing cold water through the jacket of the kettle while continuing nitrogen sparging and mechanical agitation of the solution during at least the initial part of the cooling period. A clear, viscous, concentrated solution of tungstogermanic acid resulted.

(C) Crystallization of tungstogermanic acid

The concentrated (preconcentrated) aqueous solution of tungstogermanic acid from B) was transferred to a laaboratory rotary freeze-dryer consisting of a single neck, 500 ml., round-bottom flask and provision for attachment to a vacuum system through a rotary seal. The concentrated solution was pre-frozen by placing the round-bottom flask in liquid nitrogen, and the frozen concentrate was then subjected to a lyophilic-vacuum crystallization cycle. The pressure in the system was lowered to 1–3 torr. The temperature of the material being processed was allowed to increase gradually to 20° C. (approximately room temperature) over a period of 24 hours while the pressure in the system was maintained at 1–3 torr.

The product (tungstogermanic acid) was a soft, white powder that dissolved instantly at 25° C. in cold, deionized water to give a clear solution. The solubility of the product, after storage for more than six months, was substantially unchanged.

Analytical data were typical of that usually obtained for tungstogermanic acid, $H_4[GeW_{12}O_{40}] \cdot xH_2O$, where $x$ in this instance equalled 9. The percent of W=73 and the percent of Ge=2.5; W/Ge=12±1; and the percent of Na is less than 0.05. X-ray diffraction examination showed a cubic structure that is typical of tungstophosphoric acid and other heteropoly acids.

The yield of product recovered by following the complete process described under A, B, and C, supra, was more than 90% of the theoretical yield based on the content of starting tungsten. In marked contrast, conventional recovery of crystalline acid by evaporation of solvent from an aqueous solution of tungstogermanic acid on a steam bath is usually only about 70% of the theoretical yield on the same basis just mentioned. Furthermore, the product of conventional heat-evaporative technique (and which involves neither a nitrogen sparge nor freeze-drying nor a combination of both such means) sometimes has the further disadvantage that recrystallization is additionally required in order to obtain a product that dissolves in water to give non-turbid solutions.

Example 6.—Preparation and isolation of aluminum metatungstate

A solution of ammonium metatungstate, $$(NH_4)_6[H_2W_{12}O_{40}] \cdot 12H_2O$$

made by dissolving two pounds of the salt in two liters of deionized water, was converted to the corresponding free acid, metatungstic acid, by passage through a cation-exchange resin (Illco 211) on the hydrogen cycle.

The resulting aqueous solution of metatungstic acid was then converted to an aqueous solution of aluminum metatungstate by the addition of aluminum hydroxide while heating the admixture to 80° C. The final pH of the solution was 3.7.

After clarification by filtration, the aqueous solution of aluminum metatungstate was transferred to a jacketed, covered kettle having a capacity of three liters. After initial sparging with nitrogen for 30 minutes, the contents of the kettle was heated to 80° C. (while continuing the sparging) by the circulation of steam through the jacket of the kettle. The temperature was maintained at 80° C. until the volume of the solution had been reduced to 200 ml.

The concentrated solution was then cooled to 25° C. under an atmosphere of nitrogen and transferred to a laboratory rotary freeze-dryer. Initial freezing was done in liquid nitrogen, after which the pressure was reduced to less than 5 torr and continued at this reduced pressure until a soft, powdery product resulted.

Chemical analysis of the product showed a tungsten-to-aluminum ratio of 6.5:1. The theoretical ratio of tungsten-to-aluminum in the empirical formula $$Al_2[H_2W_{12}O_{40}] \cdot xH_2O$$

is 6:1. The product was readily soluble in water. In marked contrast all attempts to crystallize aluminum metatungstate from solution solely by evaporation of the solvent from the solution on a steam bath in the conventional manner resulted in decomposition and low yields of product, more particularly less than 50% of the theoretical based on the tungsten content of the starting solution. The yield of aluminum metatungstate by the method of this invention is above 90% of the theoretical on the same basis just mentioned.

Various other metal salts of metatungstate acid can be prepared and isolated as hereinbefore described with reference to the production and isolation of aluminum metatungstate (Example 6) by adding the metal hydroxide to an aqueous solution of metatungstic acid while heating to about 80° C. until a pH from about 3.7 to about 4.0 is reached. The resulting salt solution is then concentrated while heating and sparging it with a non-oxidizing gas, e.g., nitrogen, followed by lyophilic-vacuum evaporation (freeze-drying) of the concentrated salt solution. The tungsten-to-cation (M) ratios of several such metal tungstates are listed below.

| Empirical formula: | W/M |
|---|---|
| $Ba_3[H_2W_{12}O_{40}] \cdot 8H_2O$ | 4:1 |
| $Cd_3[H_2W_{12}O_{40}] \cdot 8H_2O$ | 4:1 |
| $Cs_6[H_2W_{12}O_{40}] \cdot 8H_2O$ | 2:1 |
| $Li_6[H_2W_{12}O_{40}] \cdot 8H_2O$ | 2:1 |

The following example relative to the isolation of molybdophosphoric acid further illustrates the advantages of the isolation technique of this invention when applied to solutions of heteropoly compounds. Although molybdophosphoric acid is considered to be one of the more stable heteropolymolybdic acids, a problem does arise in preparing and isolating a product that dissolves in water to give a clear solution (i.e., non-turbid solution). This property is often specified for reagent-grade molybdophosphoric acid.

Example 7.—Preparation and isolation of 12-molybdophosphoric acid (A) Four hundred and fifty-four (454) grams of 12 molybdophosphoric acid, $H_3PMo_{12}O_{40} \cdot xH_2O$, was made by the conventional method, which was essentially the same as that described in Killefer and Lenz, Molybdenum Compounds, page 88. The solid product was isolated from the solution in the conventional manner by evaporation on a steam bath. Dissolution of a few grams of the solid product in water resulted in a turbid solution, indicating decomposition and/or degradation.

(B) A solution of 12-molybdophosphoric acid, also made by the conventional method described by Killefer and Lenz, supra, was filtered to insure clarity and absence of suspended matter. It was then placed in a jacketed glass kettle equipped with cover, agitator and nitrogen-sparging tube. The solution (one liter containing 220 g. of 12-molybdophosphoric acid) was initially sparged with $N_2$ at room temperature in order to insure an oxygen-free solution and an oxygen-free atmosphere above the liquid level of the solution in the kettle. After 30 minutes, agitation and heating of the contents by circulation of steam through the jacket of the kettle were begun. After agitating and heating for 15 hours at 70°–75° C. in this manner, the volume of the solution had been reduced to about 100 ml. No turbidity was observed during concentration of the solution.

After cooling under a nitrogen atmosphere to about ambient temperature, the concentrate was crystallized by lyophilic-vacuum evaporation in a laboratory rotary freeze-dryer. The solution was first frozen by dipping the flask containing the concentrate in liquid nitrogen. The pressure was reduced to less than .5 torr in a controlled manner to yield a solid, powdery product. The product was readily identified by X-ray diffraction examination as 12-molybdophosphoric acid.

In marked contrast to the product obtained by the isolation technique described under (A) of this example dissolution of the 12-molybdophosphoric acid resulting from the technique of the invention, i.e., a combination of preconcentration while sparging with nitrogen followed by freeze-drying of the concentrate as per part (B) of this example, gave a clear solution, free of turbidity, and equivalent to other reagent-grade materials generally obtained by laborious, slow, air-drying techniques.

Other heteropoly acids of tungsten and of molybdenum can be prepared and isolated in essentially the same manner described hereinbefore with reference to the preparation and isolation of tungstovanadic acid (Example 1), molybdogermanic acid (Example 2), molybdotungstophosphoric acid (Example 3), tungstogermanic acid (Example 5) and 12-molibdophosphoric acid (Example 7). Numerous examples of such heteropoly acids, as well as of salts of metatungistic acid other than those mentioned in the specific examples, have been given in portions of the specification prior to the examples.

The advantages of the instant invention may be summarized as follows:

(1) Means are provided to isolate by crystallization, from solution, solid heteropolytungsten and heteropolymolybdenum compounds, specifically the acids thereof, and metatungstate salts, that were previously difficult to isolate and then, usually, in relatively low yields, i.e., in yields so low as to render their manufacture commercially impractical.

(2) The recovered products are stable and can be stored at ambient temperature (about 25° C.).

(3) The recovered products retain their water-solubility and dissolve to give clear, aqueous solutions without decomposition or hydrolysis to insoluble oxide.

(4) Moisture removal is accomplished without appreciable (if any) chemical decomposition or collapse of the complex structure of the product being isolated; in other words, by maintaining control of moisture removal during isolation of the product.

(5) The recovery of a stable, crystalline or amorphous solid product is efficient.

(6) The processing time to recover a crystalline or amorphous solid product is reduced to practical, commercial limits. (Slow evaporation in air at ambient temperature, or under applied heat at temperatures below 100° C., is not adaptable to the production of larger than laboratory-scale quantities of products.)

(7) The product is recovered as a soft powder, which is readily broken up to smaller size, if desired, instead of generally being (as in the prior-art practice) an aggregate that requires milling or other work processing.

It is to be understood that the foregoing detailed description is given merely by way of illustration and that many variations may be made therein without departing from the spirit and scope of the invention.

What is claimed is:

1. In a method of preparing a complex compound selected from the group consisting of heteropolytungsten compounds, heteropolymolybdenum compounds and salts of metatungstic acid and wherein the said compound is to be recovered from a solution thereof in a volatile solvent, the improvement which comprises recovering the said compound from the said solution by
   (A) preconcentrating the said solution by evaporating it under heat while sparging the solution with a non-oxidizing gas and concurrently maintaining the solution in an atmosphere of a non-oxidizing gas, and
   (B) freeze-drying the preconcentrated solution until an incompletely dehydrated, solid product has been recovered therefrom.

2. The improvement as in claim 1 wherein the volatile solvent is water, the non-oxidizing gas is nitrogen gas, the heat is indirectly applied, and the solution is concentrated in step (A) to obtain a volume reduction ranging from 97% to about 10% of its original volume.

3. The improvement as in claim 2 wherein the complex heteropoly compound in the solution being concentrated is a heteropolytungstic acid, and the heat being indirectly applied is steam heat.

4. The improvement as in claim 2 wherein the complex heteropoly compound in the solution being concentrated is a heteropolymolybdic acid, and the heat being indirectly applied is steam heat.

5. The improvement as in claim 2 wherein the complex heteropoly compound in the solution being concentrated is a heteropolymolybdotungstic acid, and the heat being indirectly applied is steam heat.

6. The improvement as in claim 2 wherein the complex heteropoly compound in the solution being concentrated is a salt of metatungstic acid, and the heat being indirectly applied is steam heat.

7. The improvement as in claim 2 wherein the solution is concentrated in step (A) to a volume which is from about 50% to about 10% of its original volume.

8. The improvement as in claim 2 wherein the solution is mechanically agitated to prevent localized overheating while heat is being indirectly applied to the solution.

9. The improvement as in claim 3 wherein the heteropolytungstic acid is tungstovanadic acid.

10. The improvement as in claim 3 wherein the heteropolytungstic acid is tungstogermanic acid.

11. The improvement as in claim 4 wherein the heteropolymolybdic acid is molydogermanic acid.

12. The improvement as in claim 4 wherein the heteropolymolybdic tungstic acid is molybdotugnstophosphoric acid.

13. The improvement as in claim 6 wherein the salt of metatungstic acid is chromium metatungstate.

14. The improvement as in claim 6 wherein the salt of metatungstic acid is aluminum metatungstate.

15. The improvement as in claim 1 wherein the solution that is to be preconcentrated by evaporation under heat is sparged with a non-oxidizing gas at ambient temperature prior to evaporating it under heat in order to insure an oxygen-free atmosphere above the liquid level of the solution during subsequent evaporation under heat while continuing to sparge the heated solution with a non-oxidizing gas.

16. The improvement as in claim 1 wherein the preconcentrated solution from step (A) is cooled to approximately ambient temperature while continuing to sparge it with a non-oxidizing gas and while mechanically agitating the solution during at least the initial portion of the said cooling period.

17. The improvement as in claim 1 wherein the volatile solvent is water, the non-oxidizing gas is nitrogen gas, the heat is indirectly applied, the solution is concentrated in step (A) at a temperature within the range of from about 65° C. to about 85° C. to obtain a volume reduction ranging from 97% to about 10% of its original volume, and the concentrated solution from step (A) is prefrozen immediately prior to subjecting it to freeze-drying.

18. The improvement as in claim 1 wherein the temperature of the concentrated solution is allowed to increase slowly from the lowest temperature to which it is subjected during the freeze-drying cycle in order to accelerate the sublimation of water.

References Cited

UNITED STATES PATENTS 3,192,013   6/1965   Young _____ 159—16 X

WILLIAM J. WYE, *Primary Examiner.*

U.S. Cl. X.R.

23—140, 306; 159—16

PO-1050
(5/69)

UNITED STATES PATENT OFFICE
CERTIFICATE OF CORRECTION

Patent No. 3,440,732　　　　　　Dated 4/29/69

Inventor(s) Vincent Chiola, Robert E. Dodds, & Clarence D. Vanderpoo

It is certified that error appears in the above-identified patent and that said Letters Patent are hereby corrected as shown below:

Column 3, line 40 of the specification "insoluatable" should read --isolatable--.

Column 5, line 34 "of such" should read --of any such--;
　　　　　　line 73 "Laferty" should read --Laferty, Jr.--.

Column 6, line 38 "evaporation" should read --evaporative--.

Column 8, line 20 ".19H$_2$0" should read --.9H$_2$0--;
　　　　　　line 67 in the second instance "of" should read --to--.

Column 9, line 11 "100" should read --1000--.

Column 13, line 3 "containing 220g" should read --containing about 220g--.

SIGNED AND
SEALED
FEB 3 1970

(SEAL)
Attest:

Edward M. Fletcher, Jr.　　　　　　WILLIAM E. SCHUYLER, JR.
Attesting Officer　　　　　　　　　　Commissioner of Patents